(12) United States Patent
Hartner et al.

(10) Patent No.: US 10,465,753 B2
(45) Date of Patent: Nov. 5, 2019

(54) MULTI-PLATE CLUTCH

(71) Applicant: Miba Frictec GmbH, Laakirchen (AT)

(72) Inventors: Gerhard Hartner, Bad Wimsbach (AT); Florian Markowsky, Gmunden (AT)

(73) Assignee: Miba Frictec GmbH, Laakirchen (AT)

( * ) Notice: Subject to any disclaimer, the term of this patent is extended or adjusted under 35 U.S.C. 154(b) by 241 days.

(21) Appl. No.: 15/431,854

(22) Filed: Feb. 14, 2017

(65) Prior Publication Data

US 2017/0254368 A1    Sep. 7, 2017

(30) Foreign Application Priority Data

Mar. 7, 2016  (AT) .............................. A 50182/2016

(51) Int. Cl.
*F16D 13/74* (2006.01)
*F16D 13/52* (2006.01)
(Continued)

(52) U.S. Cl.
CPC ............. *F16D 13/74* (2013.01); *F16D 13/52* (2013.01); *F16D 13/648* (2013.01);
(Continued)

(58) Field of Classification Search
CPC ........ F16D 13/74; F16D 13/52; F16D 13/748; F16D 13/683; F16D 25/0638;
(Continued)

(56) References Cited

U.S. PATENT DOCUMENTS 5,755,314 A * 5/1998 Kanda ................. F16D 25/0638
192/113.35
6,135,256 A    10/2000 Han et al.
(Continued)

FOREIGN PATENT DOCUMENTS

EP    0 848 176 A1    6/1998
EP    2 706 251 A2    3/2014
(Continued)

*Primary Examiner* — Tinh T Dang
(74) *Attorney, Agent, or Firm* — Collard & Roe, P.C.

(57) ABSTRACT

The invention relates to a wet-running multi-plate clutch (1) comprising a number of inner plates (2) and a number of outer plates (3), and a first friction lining (6) is disposed on either side of every inner plate (2) respectively and a second friction lining (8) is disposed on either side of every outer plate (3) respectively, and the first friction linings (6) are located entirely underneath the second friction linings (8) in the radial direction so that the first friction linings (6) move into frictional contact with the outer plate main bodies (7) when the multi-plate clutch (1) is engaged and the second friction linings (8) move into frictional contact with the inner plate main bodies (5) when the multi-plate clutch (1) is engaged. The first friction linings (6) respectively have at least one first groove (13) with a groove depth of up to 100% of a friction lining thickness of the first friction linings (6) and the second friction linings (8) have no or respectively have at least one second groove (16) which has a smaller cross-sectional surface area, as viewed in the longitudinal extension of the second grooves (16), than the first grooves (13) as viewed in the same direction.

15 Claims, 7 Drawing Sheets

Figure 2:
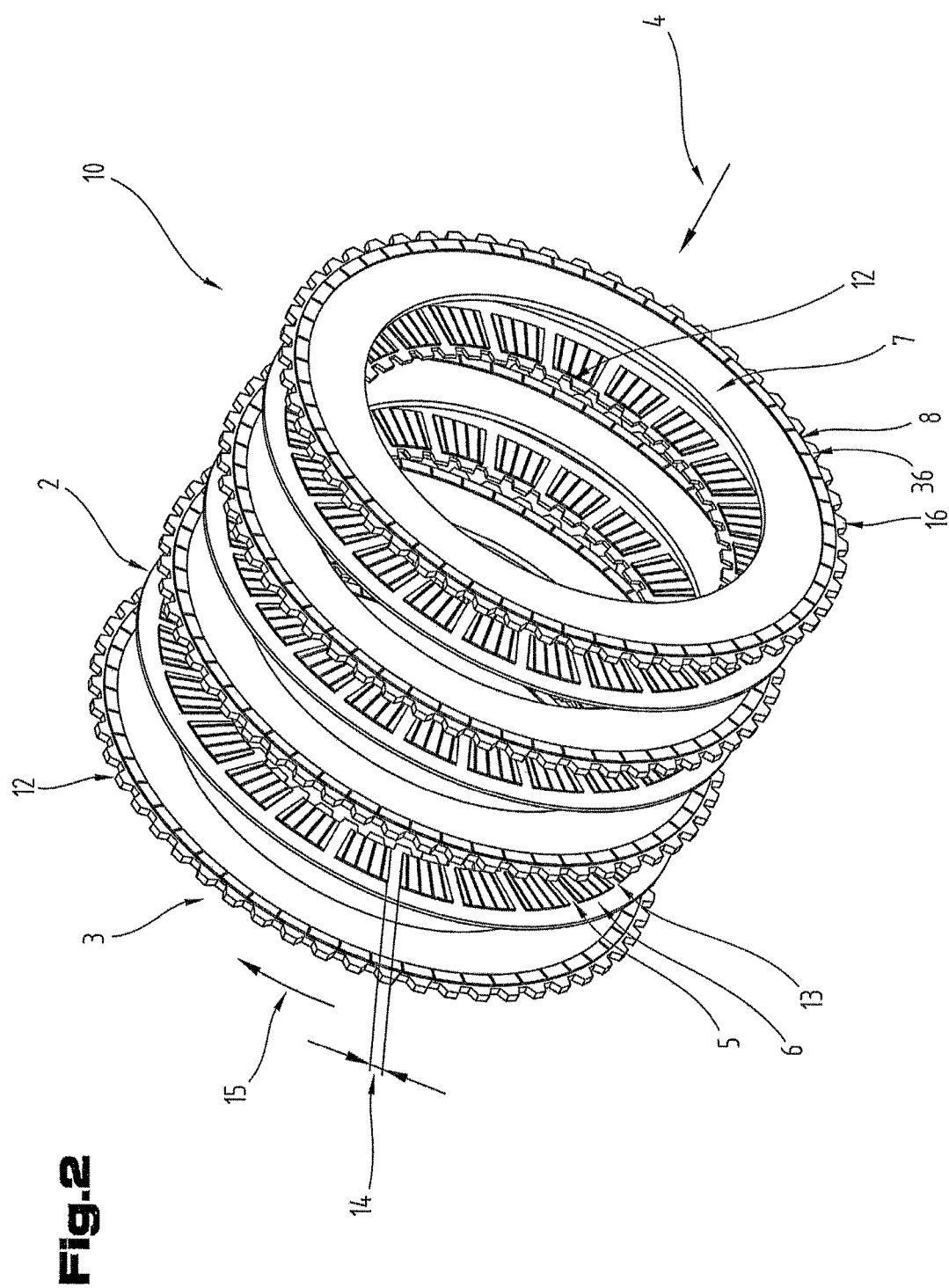

(51) Int. Cl.
*F16D 13/64* (2006.01)
*F16D 13/68* (2006.01)
*F16D 25/0638* (2006.01)
*F16D 69/00* (2006.01)
*F16D 69/02* (2006.01)

(52) U.S. Cl.
CPC ....... F16D 13/683 (2013.01); F16D 25/0638 (2013.01); F16D 69/02 (2013.01); *F16D 2069/002* (2013.01); *F16D 2069/004* (2013.01); *F16D 2069/005* (2013.01)

(58) Field of Classification Search
CPC ............... F16D 69/02; F16D 2069/002; F16D 2069/004; F16D 2069/005; F16D 2069/006; F16D 13/648
See application file for complete search history.

(56) References Cited

U.S. PATENT DOCUMENTS

| | | | | |
|---|---|---|---|---|
| 6,293,382 B1 * | 9/2001 | Nishide | ................... | F16D 13/72 192/107 R |
| 6,397,997 B2 | 6/2002 | Kato | | |
| 6,702,088 B2 * | 3/2004 | Kitaori | ................ | F16D 25/0638 192/113.36 |
| 6,712,190 B2 * | 3/2004 | Kitaori | .................. | F16D 13/648 188/264 B |
| 7,650,977 B2 * | 1/2010 | Suzuki | .................. | F16D 13/648 192/113.36 |
| 7,770,708 B2 | 8/2010 | Toya | | |
| 7,779,980 B2 * | 8/2010 | Toya | ................... | F16D 25/0638 192/107 R |
| 7,823,712 B2 * | 11/2010 | Toya | .................. | F16D 25/0638 192/107 R |
| 8,474,590 B2 * | 7/2013 | Fabricius | ............... | F16D 13/648 192/107 R |
| 9,027,728 B2 * | 5/2015 | Hiramatsu | ............ | F16D 13/648 192/113.36 |
| 2004/0074731 A1 * | 4/2004 | Miyoshi | ................ | F16D 13/648 192/70.2 |
| 2007/0151822 A1 * | 7/2007 | Toya | ....................... | F16D 13/64 192/70.14 |
| 2017/0122383 A1 * | 5/2017 | Sugimura | ............... | F16D 13/72 |

FOREIGN PATENT DOCUMENTS

GB 914 220 A 12/1962
JP H09-137833 A 5/1997

* cited by examiner

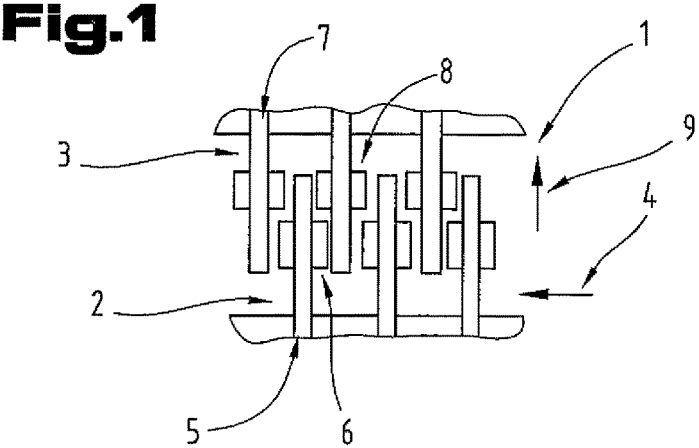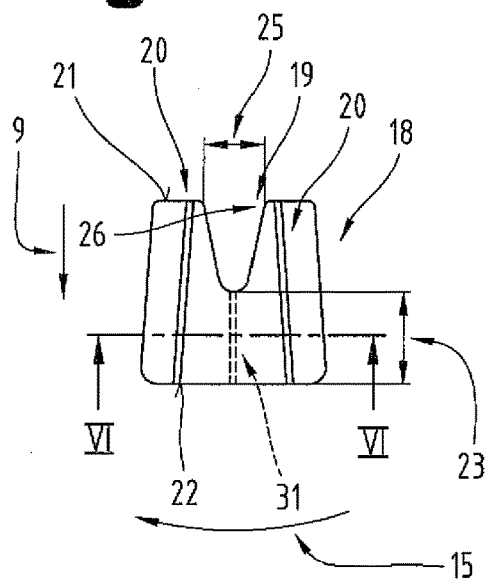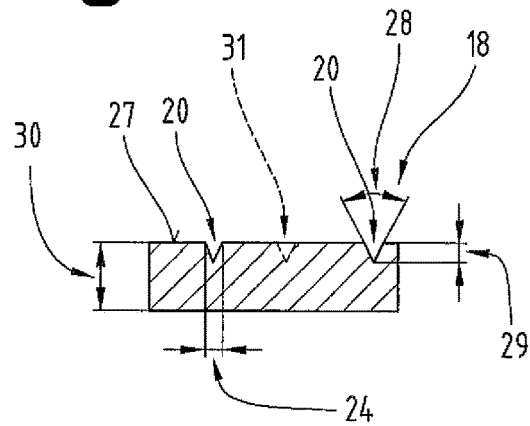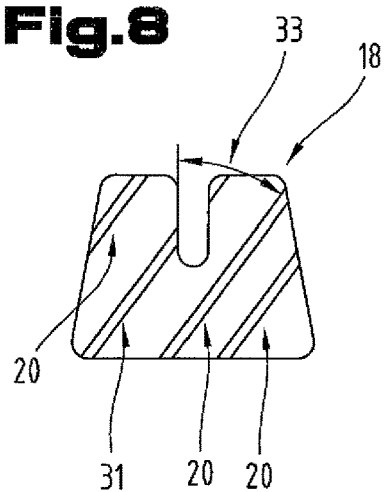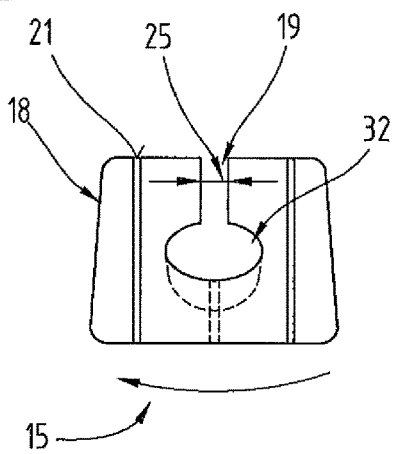

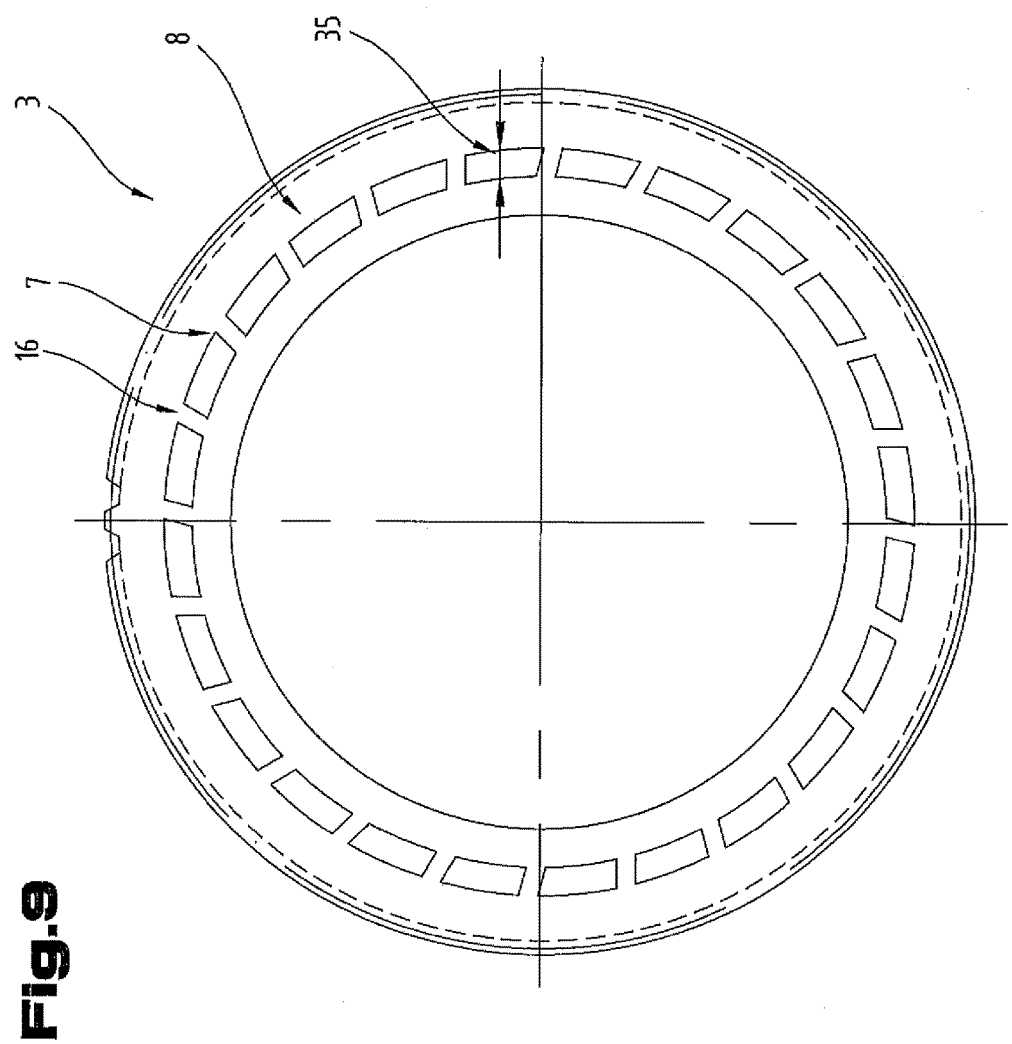

MULTI-PLATE CLUTCH

CROSS REFERENCE TO RELATED APPLICATIONS

Applicant claims priority under 35 U.S.C. § 119 of Austrian Application No. A50182/2016 filed on Mar. 7, 2016, the disclosure of which is incorporated by reference.

The invention relates to a wet-running multi-plate clutch comprising a number of inner plates and a number of outer plates which are disposed in an alternating arrangement in the axial direction, each inner plate having an inner plate main body on each side of which respectively at least one first friction lining is disposed, and each outer plate has an outer plate main body on each side of which respectively at least one second friction lining is disposed, and the first friction linings are located entirely underneath the second friction linings in the radial direction so that the first friction linings move into frictional contact with the outer plate main bodies when the multi-plate clutch is engaged and the second friction linings move into frictional contact with the inner plate main bodies when the multi-plate clutch is engaged.

A multi-plate clutch of this type is known from U.S. Pat. No. 6,397,997 B2, U.S. Pat. No. 7,770,708 B2, U.S. Pat. Nos. 7,779,980 B2, 7,823,712 B2 and US 2007/0151822 A1.

In wet-running multi-plate clutches, a fluid, usually lubricating oil, is used as a means of improving dissipation of the heat generated by friction. The intention is to prevent overheating of the friction linings and premature destruction caused as a result.

Friction linings are usually only fitted on the inner plates. By contrast, the US publications mentioned above describe designs of a multi-plate clutch with friction linings on both the inner and outer plates. The heat generated by the frictional contact is more effectively distributed because not only the inner plates but also the outer plates can be used to dispel heat.

The underlying objective of this invention is to propose a multi-plate clutch which exhibits improved performance during operation.

This objective is achieved on the basis of a multi-plate clutch of the type outlined above due to the fact that the first friction linings respectively have at least one first groove with a groove depth of up to 100% of a friction lining thickness of the first friction linings and the second friction linings have no or respectively have at least one second groove which has a smaller cross-sectional surface area as viewed in the longitudinal extension of the second grooves than the first grooves as viewed in the same direction and/or the first grooves are disposed offset from the second grooves in the circumferential direction.

As a result of this design of the multi-plate clutch, the lubricant remains in the region of the friction linings longer. Due to the longer dwell time, the lubricant is able to absorb a larger amount of heat and the improved heat dissipation enables cooling efficiency and hence the performance of the multi-plate clutch to be improved. However, by providing the first grooves and optionally the second grooves, if they are provided, drag torque can be reduced at the same time because the lubricant is able to flow away largely unhindered when the clutch is disengaged. Depending on the viscosity of the lubricant, a greater or lesser drag torque will occur because the friction surfaces sit in contact to a greater or lesser degree with the surface of the respective co-operating plates via the lubricant. This in turn leads to a loss of performance of these friction systems. Another advantage of the multi-plate clutch is that due to the prevailing lubricant pressure in the region of the friction linings caused by the longer dwell time of the lubricant in this region, separation of the plates on disengagement is improved, as a result of which the drag torque can likewise be reduced. This means that it is also not necessary to use corrugated plates such as often used these days in order to obtain better separation of the plates. The fact of not having to use corrugated plates in turn makes production of the plates easier and less expensive. The described design of the multi-plate clutch also enables the no-load characteristic of the multi-plate clutch to be influenced because the lubricant flow can be adjusted on the basis of the disposition, design and dimensioning of the grooves depending on rotation. The resultant of the tangential and radial lubricant flow via the first and second grooves can be adjusted and/or controlled relative to one another. Furthermore, a laminar flow of the lubricant can be converted into a turbulent flow in the region of the friction linings.

Based on one embodiment of the multi-plate clutch, the first and/or the second grooves may be disposed so that they extend at an angle with respect to the radial direction. This enables the cooling efficiency to be further improved due to a longer dwell time of the lubricant in the region of the friction linings.

With this embodiment, it has proved to be of advantage if the first and/or the second grooves are disposed extending at an angle of between 1° and 30° with respect to the radial direction. It has been found that the no-load loss can be reduced much more efficiently within this range of angles due to the conveying effect achieved by the angled position.

For the reasons outlined above, it is also of advantage if, based on another embodiment, the first and/or the second grooves extend in a curved arrangement. If both the first and the second grooves are of a curved design, the curvature of the first and second grooves may be such that, tantamount to the turbine principle, the first grooves (inner grooves) act like rotor blades (pump vanes) and the second grooves (outer grooves) act like stator blades. However, the converse functionality would also be possible.

Based on another embodiment, the first friction linings may be made from a different material from the material of the second friction linings. By superimposing two friction characteristics, the amount of heat generated can be influenced.

Based on one embodiment in this respect, the second friction linings may be made from a material that is more resistant to wear than the material of the first friction linings. This enables the second friction linings to be exposed to higher temperatures, as a result of which the number and/or size of the second grooves can be reduced so that the lubricant is able to remain longer in the region of the friction linings as a result.

Better lubrication and hence better cooling efficiency can also be achieved if the second friction linings have a bigger layer thickness than the first friction linings. What is achieved with this embodiment is that the oil is largely prevented from flowing away from the region of the second, radially outer friction linings when the clutch is engaged but the lubricant in the region of the first, in other words radially inner, friction linings is still able to "circulate".

Based on another embodiment, the first friction lining is formed by first friction lining segments and at least one third groove and a number of fourth grooves are provided in each of the first friction lining segments, and the at least one third groove extends from a radially inner end face of the first friction lining segments in the direction towards a radially outer end face of the first friction lining segments and terminate at a distance from the radially outer end face, and the fourth grooves have a maximum width in the circumferential direction of between 1% and 20% of a maximum width of the third groove in the same direction and the fourth grooves extend, without interruption and without branching, from the radially inner end face of the first friction lining segments into the radially outer end face of the first friction lining segments. The advantage of this is that lubricating the friction lining segments via the third groove enables the heat generated by friction to be dissipated more rapidly. Due to the very thin fourth grooves provided in addition, on the other hand, the drag torque can be significantly reduced, thereby enabling performance of the wet-running clutch to be improved. Furthermore, as a result of these thin fourth grooves, any foreign particles in the lubricating oil are held back, at least to a certain extent, thereby enabling a flow of cleaner lubricating oil through these grooves. This improves lubrication of the friction lining segments. Any particles of dirt can be fed away through the first grooves disposed between the friction lining segments due to their spacing with respect to one another.

To reduce drag torque still further making use of the effect described above, the second friction lining is formed by second friction lining segments, and a number of fifth grooves are provided in each of the second friction lining segments, and the fifth grooves have a maximum width in the circumferential direction of between 1% and 20% of a maximum width of the second groove in the same direction, and the fifth grooves extend, without interruption and without branching, from the radially inner end face of the second friction lining segments into the radially outer end face of the second friction lining segments.

Based on one embodiment of the multi-plate clutch, the fourth and/or fifth grooves may have a triangular cross-section. On the one hand, this further improves the effects described above. On the other hand, fourth and/or fifth grooves are easier to produce because an appropriately shaped cutting-type tool can be more easily pushed into the friction lining segments. The thin geometry of the fourth and/or fifth grooves can therefore be produced with greater precision.

To prevent a build-up of lubricant in the third groove and/or the second groove, a sixth groove may be provided adjoining the radially outer end of the third groove and the sixth groove extends into the radially outer end face of the first friction lining segments and/or a seventh groove is provided adjoining the radially outer end of the second groove and the seventh third groove extends into the radially outer end face of the second friction lining segments.

The sixth groove preferably has a maximum width in the circumferential direction of between 1% and 20% of a maximum width of the third groove in the same direction and/or the seventh groove has a maximum width in the circumferential direction of between 1% and 20% of a maximum width of the second groove in the same direction, thereby assisting the effect described above.

To improve the flow of lubricant into the third groove and/or second groove, the third groove has a cross-section which becomes wider in the direction towards the radially inner end face of the first friction lining segments and/or the second groove has a cross-section which becomes wider in the direction towards the radially inner end face of the second friction lining segments.

To increase the volume of oil in the friction lining or in the friction linings, the third groove may have a cross-sectional widening in the region of the radially outer end and/or the second groove may have a cross-sectional widening in the region of the radially outer end. This extra volume may simultaneously contribute to reducing a build-up of lubricant in the friction linings so that the lubricant is able to flow out of the friction linings in a more controlled manner.

Based on another embodiment in this respect, the third groove may be at least approximately mushroom-shaped and/or the second groove may be at least approximately mushroom-shaped, as a result of which the buffering effect of the third and/or second groove can be improved.

Based on other embodiments of the multi-plate clutch, at least two first friction linings are provided on the inner plate main body at a radial distance apart from one another and the radial distance is bigger than a radial width of the second friction lining or second friction linings, so that the second friction lining or second friction linings is or are able to engage between the first friction linings when the multi-plate clutch is engaged or at least two second friction linings are provided on the outer plate main body at a radial distance apart from one another and the radial distance is bigger than a radial width of the first friction lining or first friction linings so that the first friction lining or first friction linings is or are able to engage between the second friction linings when the multi-plate clutch is engaged. This enables the effects described above to be further improved.

To provide a clearer understanding, the invention will be described in more detail below with reference to the drawings.

Figure 3:
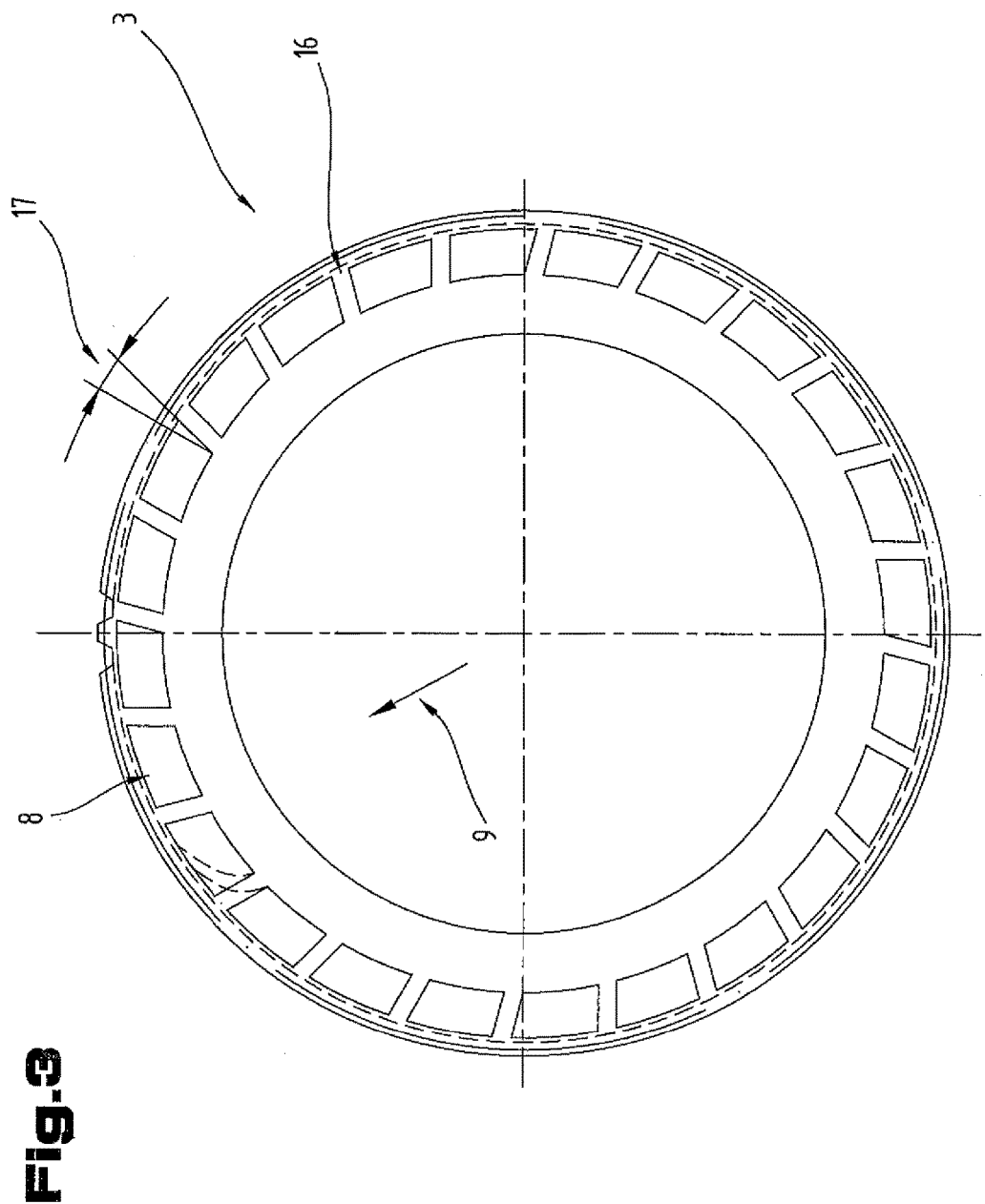
Figure 4:
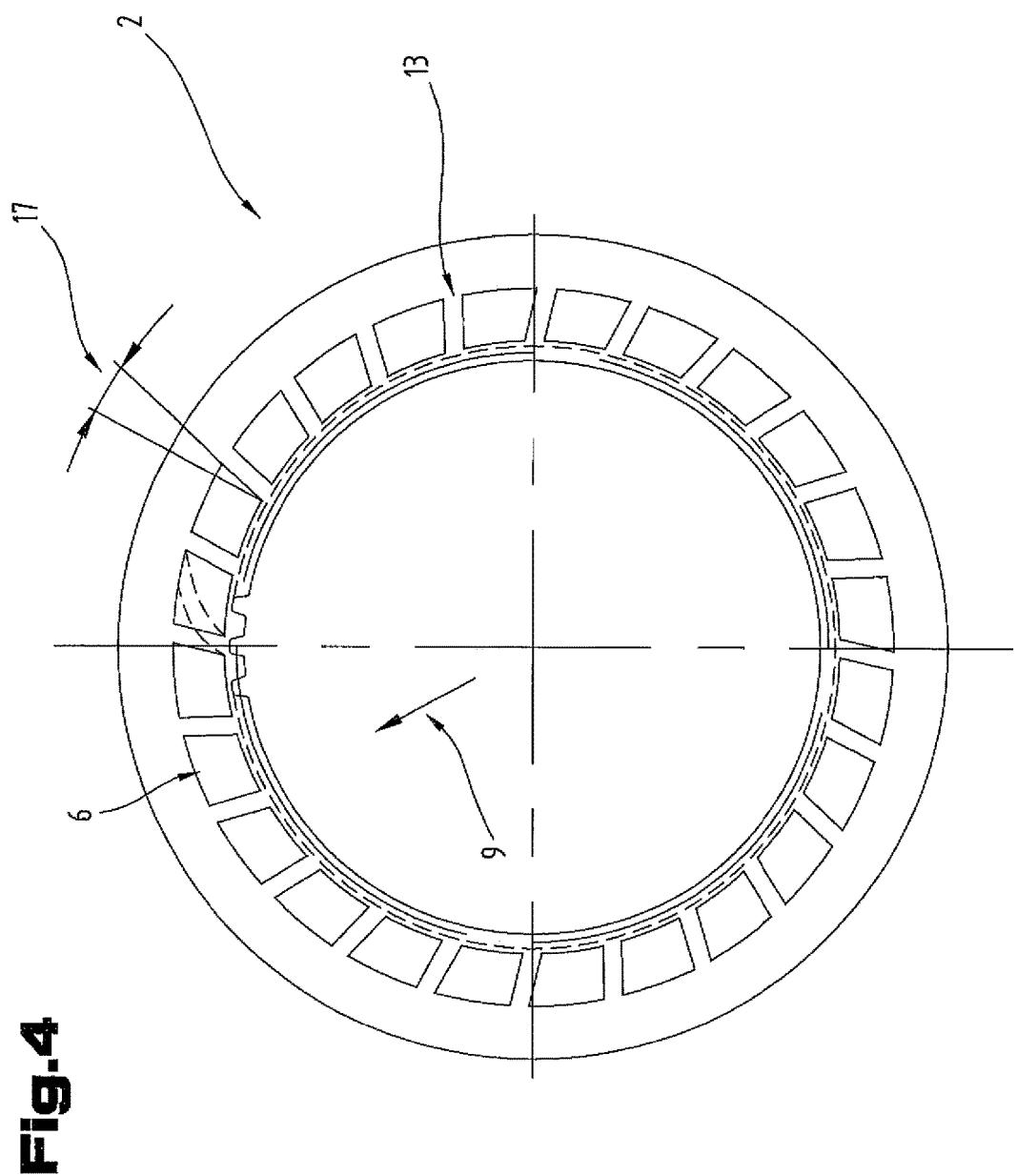
Figure 10:
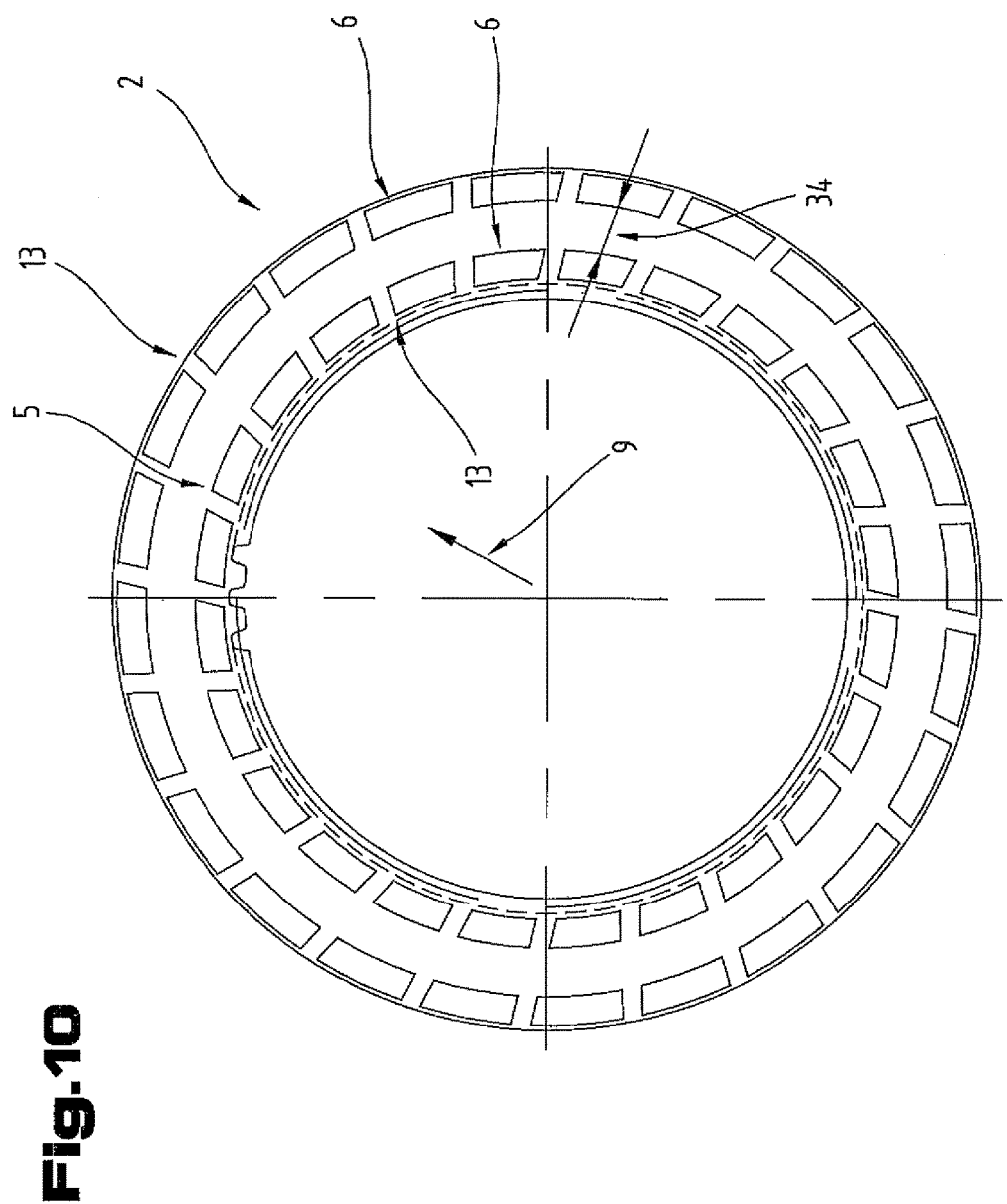
Figure 11:
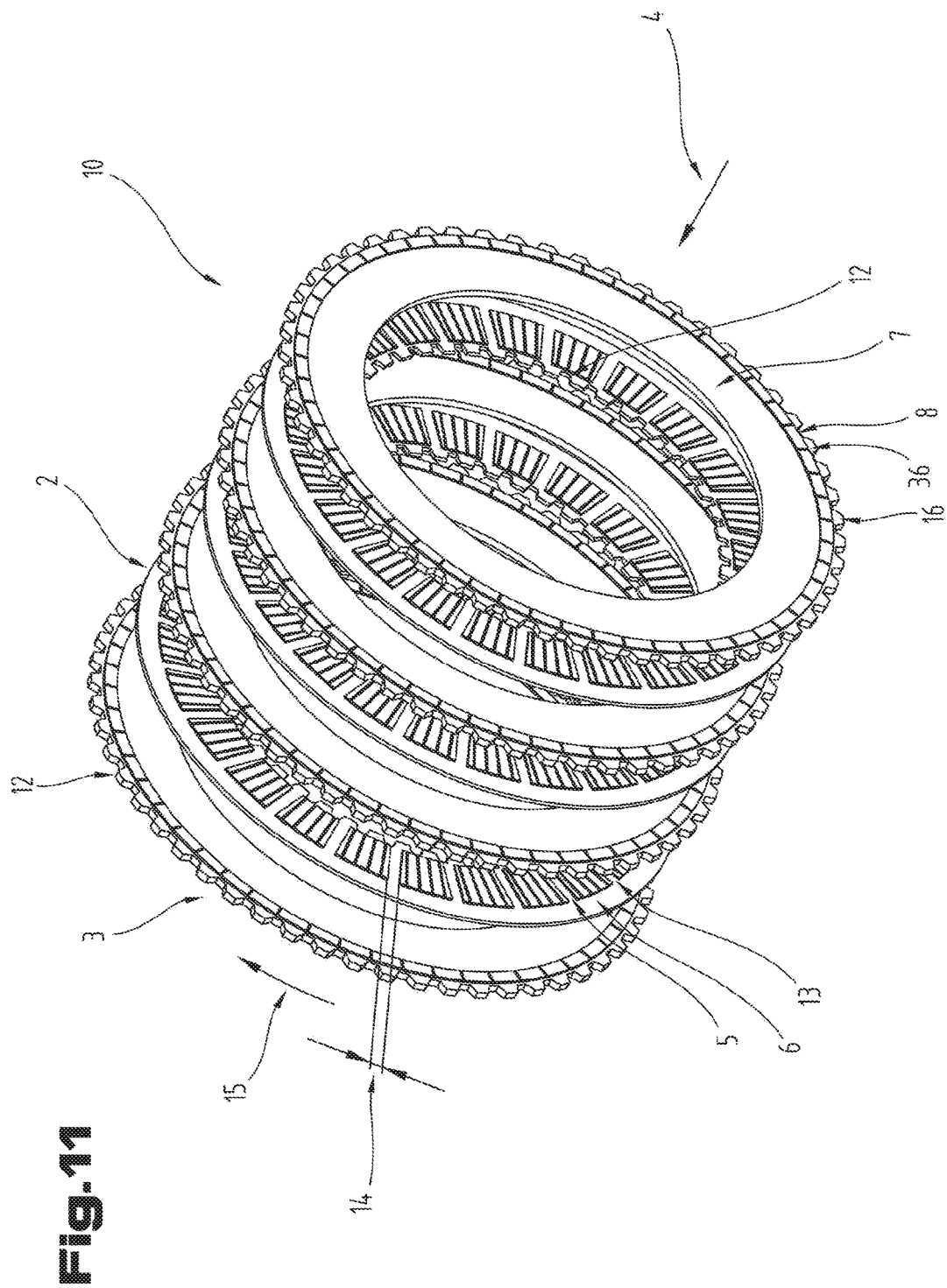

These are simplified, schematic diagrams illustrating the following:

FIG. 1 a side view illustrating a detail of a multi-plate clutch;

FIG. 2 a set of plates viewed from an angle;

FIG. 3 an outer plate of one embodiment of the multi-plate clutch;

FIG. 4 an inner plate of the embodiment of the multi-plate clutch illustrated in FIG. 3;

FIG. 5 a plan view of a friction plate segment of an embodiment of the multi-plate clutch;

FIG. 6 the friction plate segment illustrated in FIG. 5 viewed from the side in section along line VI-VI indicated in FIG. 5;

FIG. 7 a plan view of another embodiment of a friction plate segment;

FIG. 8 a plan view of another embodiment of a friction plate segment;

FIG. 9 an outer plate of one embodiment of the multi-plate clutch;

FIG. 10 an inner plate of the embodiment of the multi-plate clutch illustrated in FIG. 9; and FIG. 11 a set of plates viewed from an angle showing the several fifth grooves.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIG. 1 illustrates a detail of a wet-running multi-plate clutch 1. The multi-plate clutch 1 comprises a number of inner plates 2 and a number of outer plates 3. The inner plates 2 are disposed on an inner plate carrier alternating in an axial direction 4 with the outer plates 3 disposed on an outer plate carrier. The inner plates 2 are displaceable in the axial direction 4 relative to the outer plates 3 via an appropriate actuating mechanism so that a frictional contact is established between the inner plates 2 and the outer plates 3.

Every inner plate 2 has an inner plate main body 5 on either side of which (as viewed in the axial direction 4) at least one first friction lining 6 is disposed respectively. Similarly, every outer plate 3 has an outer plate main body 7 on either side of which (again as viewed in the axial direction 4) at least one second friction lining 8 is disposed respectively. The first friction linings 6 are located entirely underneath the second friction linings 8 in a radial direction 9, as may be seen from FIG. 1. As a result, when the multi-plate clutch 1 is engaged, the first friction linings 6 are in frictional contact with the outer plate main bodies 7 of the respective directly adjacent outer plates 3 and the second friction linings 8 are in frictional contact with the inner plate main bodies 5 of the respective directly adjacent inner plates 2 when the multi-plate clutch 1 is engaged.

The inner plate main body 5 and the outer plate main body 7 are made from a metal material in particular, for example steel.

This basic construction of such a wet-running multi-plate clutch 1 is known from the prior art. For further details, reference may therefore be made to the relevant prior art.

FIG. 2 illustrates an embodiment of a set of plates 10 comprising four outer plates 3 and three inner plates 2 such as used in the multi-plate clutch 1 illustrated in FIG. 1. It should be noted that the specified numbers of inner plates 2 and outer plates 3 are merely given as an example. The exact number of these plates will depend on the respective intended purpose of and demands placed on the multi-plate clutch 1. For example, the set of plates 10 may have between two and twenty outer plates 3 and between one and 19 inner plates 2.

The inner plates 2 have an inner plate toothing 11 and the outer plates 3 have an outer plate toothing 12, by means of which they are connected to the inner plate carrier respectively to the outer plate carrier so as to rotate in unison therewith. Naturally, the inner and outer plates 2, 3 may also be connected to the respective carriers in some other way to enable them to rotate in unison.

A more detailed explanation will now be given of an inner plate 2 and an outer plate 3. However, the corresponding explanations apply to all of the inner plates 2 respectively outer plates 3 of the multi-plate clutch 1 because all of the inner plates 2 and all of the outer plates 3 of the multi-plate clutch 1 are preferably of the same design in each case.

The first friction lining 6 disposed on and connected to the inner plate main body 5, in particular bonded to it, is of an annular design and has at least one first groove 13, in particular several first grooves 13. The purpose of these first grooves 13 is to direct lubricant, and lubricating oil in particular is used as the lubricant. The first grooves 13 may therefore also be described as oil grooves.

Whenever grooves are described hereafter, these are always lubricant grooves (oil grooves) unless stated otherwise.

The at least one first groove 13 has a groove depth (in the direction of the axial direction 4) of up to 100% of a friction lining thickness (in the direction of the axial direction 4). In the case of the embodiment specifically illustrated in FIG. 2, the groove depth is 100% of the friction lining thickness so that the annular first friction lining 6 is segmented. However, it would also be possible to opt for smaller groove depths, for example in the region of 10% to 99% of the friction lining thickness.

A width 14 of the at least one first groove 13 in a circumferential direction 15 of the inner plate 2 is preferably dimensioned so that a cross-sectional surface area of the at least one first groove 13, as viewed in the radial direction 9 (FIG. 1), is between 0.1 mm$^2$ and 32 mm$^2$, in particular between 0.3 mm$^2$ and 18 mm$^2$.

Although only one first friction lining 8 is illustrated, it would also be possible for the inner plate 2 to have more than one, for example two or three, first friction linings 6 disposed one above the other in the radial direction 9. However many first friction linings 6 there are, they may be of the same design, in particular as regards aspects of the grooves. However, aspects of the grooves may also be different. For example, the first grooves 13 may be offset in the circumferential direction 15.

The second friction lining 8 disposed on and connected to the outer plate main body 7, in particular bonded to it, is likewise of an annular design. The second friction lining 8 may have no grooves, in other words is a closed ring in particular having a constant lining thickness around the entire circumference. However, the second friction lining 8 preferably has at least one, in particular more than one, second groove 16, as illustrated in FIG. 2. The at least one second groove 16 has a cross-sectional surface area in the radial direction 9 (FIG. 1) which is smaller than the cross-sectional surface area of the at least one first groove 13 viewed in the same direction. In particular, the cross-sectional surface area of the at least one second groove 16 may be between 1% and 99%, preferably between 5% and 80%, of the cross-sectional surface area of the at least one first groove 13. To achieve this, the groove depth (in the direction of the axial direction 4) and the groove width (in the direction of the circumferential direction 15) of the at least one second groove 16 may be varied accordingly.

However, it would also be possible for the at least one second friction lining 8 to be provided in the form of a closed ring. Another option is for the at least one second groove 16 to have a cross-sectional surface area in the radial direction 9 (FIG. 1) which is bigger than the cross-sectional surface area of the at least one first groove 13 as viewed in the same direction. In particular, this being the case, the cross-sectional surface area of the at least one second groove 16 may be between 101% and 1000%, preferably between 101% and 200%, of the cross-sectional surface area of the at least one first groove 13.

Based on the preferred embodiment, the various first grooves 13 of the first friction lining 6 and the various second grooves 16 of the second friction lining 8 are uniformly distributed in the circumferential direction 15, in other words are disposed or arranged at an equal distance from one another respectively.

Alternatively or in addition to this embodiment with the at least one smaller second groove 16, another option is for this at least one second groove 16 in the second friction lining 8 to be offset from the at least one first groove 13 in the first friction lining 6 in the circumferential direction 15 so that the second groove 16 or second grooves 16 is or are not disposed in alignment with the first groove 13 or first grooves 13 in the radial direction 9. Accordingly, it is not possible for lubricant to flow directly (in a straight line) out of the first grooves 13 via the second grooves 16. Based on this embodiment of the multi-plate clutch 1, the cross-sectional surface area of the at least one second groove 16 in the radial direction 9 is the same size as the cross-sectional surface area of the at least one first groove 13 as viewed in the same direction.

As may be seen from FIG. 2, the first friction lining 6 may also have yet other grooves. It is likewise possible for the second friction lining 8 to have yet other grooves. Reference may be made to the description below for more details of this.

FIGS. 3 to 10 illustrate other and optionally independent embodiments and/or details of the outer plates 3 and inner plates 2, the same reference numbers and component names being used to denote parts that are the same as those described with reference to FIGS. 1 and 2 above. To avoid unnecessary repetition, reference may be made to the more detailed description of FIGS. 1 and 2 given above.

FIGS. 3 and 4 illustrate an outer plate 3 having the second friction lining 8 and an inner plate 2 having the first friction lining 6. In this embodiment, the second grooves 16 in the second friction lining 8 and the first grooves 13 in the first friction lining 6 extend at an angle with respect to the radial direction 9. Based on the preferred embodiment, the second grooves 16 and the first grooves 13, i.e. the groove side walls bounding them, are disposed inclined at an angle 17 of between 1° and 30°, in particular at an angle 17 of between 5° and 20°, with respect to the radial direction.

The first grooves 13 are preferably inclined at the same angle 17 (both in terms of the direction of inclination and in terms of the size of the angle 17). However, it would also be possible for the first grooves 13 to be inclined at a different angle 17 from the angle 17 of the second grooves 16. In this embodiment, the second grooves 16 preferably have the bigger angle of inclination.

It is also preferable if the two first friction linings 6 on the inner plate 2 lying opposite one another in the axial direction 4 (FIG. 1) and the two second friction linings 8 on the outer plate 2 lying opposite one another in the axial direction 4, in other words the friction linings 6, 8 on the front face and rear face of the plates, are based on a design in mirror image with one another.

It is also possible for only the first grooves 13 or only the second grooves 16 to be inclined with respect to the radial direction 9.

Based on another embodiment, the first and/or the second grooves 13, 16 may extend in a curved shape, as indicated by broken lines in FIGS. 3 and 4 respectively. In this connection, the first grooves 13 and the second grooves 16 may extend in the same direction (as illustrated in FIGS. 3 and 4) or in opposite directions.

In all the embodiments of the multi-plate clutch 1, the first friction linings 6 may be made from a material that is different from the material of the second friction linings 8. In particular in this respect, the second friction linings 8 may be made from a material that is more resistant to wear than the material of the first friction linings 6. This being the case, the second friction linings 8 may be made from a carbon material and the first friction linings 6 from a less expensive, resin-bonded paper lining, for example. The materials used for friction linings are known as such and no further explanation is needed.

Based on another embodiment, it is also possible for the second friction linings 8 to have a bigger layer thickness and/or a higher density than the first friction linings 6, and the reverse of this arrangement is also possible. This enables the response characteristic and performance of the multi-plate clutch to be improved.

FIG. 5 is a plan view illustrating a first embodiment of a friction lining segment 18 and FIG. 6 is a front view in section.

As already explained above, it is possible for the first and/or second grooves 13, 16 to be so deep that their groove depth corresponds to 100% of the lining thickness. The first and/or second friction lining 6, 8 is/are therefore subdivided into friction lining segments 18.

With this embodiment, it is possible for only the first friction lining 6 or only the second friction lining 8 or both the first friction lining 6 and the second friction lining 8 to be subdivided into friction lining segments 18. If both the first friction lining 6 and the second friction lining 8 are subdivided into friction lining segments 18, the friction lining segments of the first friction lining 6 are different from the friction lining segments 18 of the second friction lining 8. The friction lining segments 18 of the second friction lining 8 are preferably wider (as viewed in the circumferential direction 15 indicated in FIG. 2) and/or have a lesser number of grooves than the friction lining segments 18 of the first friction lining 6. However, it would also be possible for all the friction lining segments 18 to be of the same design, especially if the friction lining segments 18 of the first friction lining 6 are not in alignment with the friction lining segments 18 of the second friction lining 8.

In the preferred embodiment, however, only the first friction lining 6 is provided with friction lining segments 18.

The friction lining segments 18 are disposed adjacent to one another in the circumferential direction 15 (FIG. 2). Disposed between the individual friction lining segments 18 are the first grooves 13 (or the second grooves 16).

The friction lining segments 18 are connected to the 5 inner plate main body 5 (respectively the outer plate main body 7) by bonding, in particular by means of a resin.

All the friction lining segments 18 of the inner plate 2 (respectively the outer plate 3) are preferably of the same design. For this reason, only one friction lining segment 18 will be described below. However, these explanations apply to all the friction lining segments 18 of the inner plate 2 (respectively outer plate 3).

As may be seen from FIGS. 5 and 6, each of the friction lining segments 18 is provided with a third groove 19 and a number of fourth grooves 20. The third groove 19 differs significantly from the several fourth grooves 20. For example, the third groove 19 starts in a radially inner end face 21 and extends in the direction towards a radially outer end face 22 of the friction lining segment 18 but terminates at a distance 23 before this radially outer end face 22. In other words, the third groove 19 does not extend across the entire width of the friction lining segment 18 in the radial direction 9.

The distance 23 may be selected from a range of 20% to 60%, in particular from a range of 30% to 40%, of the width of the friction lining segment 18 in the radial direction 9.

The fourth grooves 20 also start in the radially inner end face 21 and extend in the direction towards the radially outer end face 22 of the friction lining segment 18. By contrast with the third groove 19, however, the fourth grooves 22 extend continuously in the radial direction across the width of the friction lining segment 18 in the radial direction 9 and thus terminate in the radially outer end face 22.

Furthermore, the fourth grooves 20 also differ significantly from the third groove 19 in terms of a maximum width 24 in the circumferential direction 15. The fourth grooves 20 have a maximum width 24 in the circumferential direction 15 of between 1% and 20%, in particular between 1% and 10%, preferably between 1% and 5%, of a maximum width 25 of the third groove 19 in the same direction. The fourth grooves 20 are therefore significantly narrower than the third groove 19.

By maximum width 24 respectively 25 is meant the point of the respective groove 19 respectively 20 at which the width is greatest. Accordingly, it is also possible for the widths 24, 25 to vary along their extension due to different cross-sectional shapes of the grooves 19, 20.

The fourth grooves 20 preferably extend in the radial direction 9 of the inner plate 2, without interruption and without branching off, from the radially inner end face 21 of the friction lining segment 18 into the radially outer end face 22 of the friction lining segment 18. There are therefore no other grooves branching off from the fourth grooves 20.

It should be pointed out at this stage that the friction lining segments 18 may also have only the third groove 19 or only the fourth grooves 20.

The transition from the radially inner end face 21 to the third groove 19 may be of a sharp-edged design. However, this transition is preferably provided with a curvature 26 in order to improve the flow behavior of the lubricant into the third groove 19.

Similarly, the transitions from the radially inner end face 21 to the fourth grooves 20 and/or from grooves 19, 20 to the radially outer end face 22 may be of a sharp-edged or rounded design.

As may be seen more clearly from FIG. 6, the fourth grooves 20 preferably have a triangular cross-section as viewed in the direction towards the end face 21 respectively 22. Based on this embodiment of the cross-sectional shape of the width 24, the maximum width 24 of these fourth grooves 20 is located at an outer surface 27 of the friction lining segments 18. The outer surface 27 is the surface 27 which can be moved into frictional contact with the respective co-operating plate of the multi-plate clutch 1 (FIG. 1).

An angle 28 subtended by the groove side faces of the fourth grooves 20 and the triangular cross-section may be selected from a range of 50° to 110°, in particular from a range of 70° to 90°. For example, this angle 28 may be 80°.

Other cross-sectional shapes may also be used for the fourth grooves 20, for example a square shape, a rectangular shape, a trapezium shape (in particular with the largest dimension at the surface 27 of the friction lining segment 18), a semi-circular shape, etc. However, a triangular cross-sectional shape is preferred.

Based on the preferred embodiment, the fourth grooves 20 have a depth 29 in the axial direction 4 (FIG. 1) of the inner plate 2 which is selected from a range of 5% to 55%, in particular 10% to 50%, preferably 20% to 40%, of a total thickness 30 of the friction lining segment 18 in the same direction.

Based on the preferred embodiment of the friction plate 5, the third groove 19 extends in the axial direction 4 of the inner plate 2 (FIG. 1) continuously through the friction lining segment 18. The groove base of the third groove 19 in this instance constitutes the surface of the inner plate main body 5 of the inner plate 2. In this embodiment, therefore, the third groove 19 has a depth which corresponds to the total thickness 30 of the friction lining segment 18. In this instance, the friction lining segment 18 may have an approximately U-shaped cross-section as seen in plan view.

However, it would also be possible for the third groove 15 to have a shorter depth than this. This being the case, the depth of the third groove 19 may be selected from a range of 40% to 95%, in particular 50% to 95%, preferably 60%, to 95%, of the total thickness 30 of the friction lining segment 18.

Based on another embodiment of the friction lining segment 18, the third groove 19 may have a cross-section which becomes wider in the direction towards the radially inner end face 21 of the friction lining segment 18, as illustrated in FIG. 5. In this case, the maximum width 25 of the third groove 19 is then at the radially inner end face 21.

As illustrated in FIG. 5, the third groove 19 of this embodiment has an approximately trapezium-shaped cross-section as seen in plan view but the end of the third groove 19 lying closer to the radially outer end face 22 is preferably rounded.

However, it would also be possible to use other cross-sectional shapes for the third groove 19, again as seen in plan view, for example a rectangular shape, etc.

If the third groove 19 does not extend through the total thickness 30 of the friction lining segment 18, the third groove 19 may also have a varying cross-section in this direction, i.e. in the direction of the depth of the third groove 19, in which case the maximum width 25 of the third groove 19 is at the outer surface 27 of the friction lining segment 18.

As already mentioned, the second friction lining 8 may also be of a segmented design. In this case, it is preferable if the second friction lining 8 is formed by second friction lining segments and several fifth grooves 36 are provided in each of the second friction lining segments, and the fifth grooves 36 have a maximum width in the circumferential direction of between 1% and 20% of a maximum width of the second groove 16 in the same direction, and the fifth grooves 36 extend, without interruption and without branching, from the radially inner end face of the second friction lining segments to the radially outer end face of the second friction lining segments.

In this embodiment, the fifth grooves 36 may be the same as the fourth grooves 20 of the friction lining segments 18. The corresponding explanations therefore apply.

Based on another embodiment, as indicated by broken lines in FIG. 5, a sixth groove 31 may be provided adjoining the radially outer end of the third groove 19 and this sixth groove 31 extends into the radially outer end face 22 of the friction lining segment 18. The explanations given above in connection with the fourth grooves 20 preferably apply to this sixth groove 31, in particular in terms of the maximum width 24 and/or the depth 29 and/or the cross-sectional shape.

If the second groove 16 in the second friction lining 8 is of the same design as the third groove 19 in the first friction lining 6, it is possible to provide a seventh groove adjoining the radially outer end of the second groove, and the seventh third groove extends as far as the radially outer end face of the second friction lining segments. The seventh groove may be identical to the sixth groove 31.

Based on one embodiment, a transition from the third groove 19 to the sixth groove 31 in the radial direction may be at least partially sloped in order to prevent a build-up.

In the case of the embodiment of the friction lining segment 18 illustrated in FIG. 7, the third groove 19 has a cross-sectional widening 32 in the region of the radially outer end.

It should be pointed out that this cross-sectional widening 32 is not used when determining the maximum width 25 of the third groove 19. The maximum width 25 of the third groove 19 is determined only by the region of the third groove 19 which lies before this cross-sectional widening 32.

In respect of this embodiment of the friction lining segment 18, it should also be made clear that the third groove 19 may also have a constant width 25 in the circumferential direction 15 of the inner plate 5—with the exception of the cross-sectional widening 32—and therefore need not necessarily become wider in the direction towards the radially inner end face 21, although this is preferred.

The cross-sectional widening 32 may be such that the third groove 19 has an at least approximately mushroom-shaped cross-section as seen in plan view.

However, the cross-sectional widening 32 may also be of other cross-sectional shapes (likewise as viewed from above onto the friction lining segment 18), for example at least approximately circular, as indicated by broken lines in FIG. 6.

The fourth and/or sixth groove 22, 31 is/are preferably disposed so that they extend in the radial direction 9 of the inner plate 5, as may be seen from FIGS. 5 and 6.

However, as with the embodiment of the friction lining segment 18 illustrated in FIG. 8, the fourth and/or sixth groove 22, 31 may extend at an acute angle 33 to the radial direction 9.

Generally speaking, it should be pointed out that in the diagrams of the friction lining segments 18 shown in FIGS. 5 to 7, a fourth groove 20 is provided to the left and right respectively of the third groove 19. Also, only one sixth groove 31 is illustrated in each case. Although this is the preferred embodiment of the friction lining segment 18, it would also be possible to provide more than two fourth grooves 20 and/or more than one sixth groove 31 in the friction lining segment 18.

FIGS. 9 and 10 illustrate an outer plate 3 with the second friction lining 8 respectively an inner plate 2 with the first friction lining 6 and in this embodiment, two first friction linings 6 are provided on the inner plate 2 one above the other in the radial direction 9. The two first friction linings 6 are spaced apart from one another. A distance 34 between the first friction linings 6 is greater than a radial width 35 of the second friction lining 8 on the outer plate 3. The first friction linings 6 are also positioned on the inner plate 2 at such a point that when the multi-plate clutch 1 is engaged (FIG. 1), the second friction lining 8 of the outer plate 3 engages between the two first friction linings 6, i.e. the first and second friction linings 6, 8 mesh with one another. As a result, the first friction linings 6 come into contact with the outer plate main body 7 and the second friction lining comes into contact with the inner plate main body 5.

In principle, it would also be possible to provide more than two first friction linings 6 in the radial direction 9 one above the other on the inner plate 2, for example three or four. In this case, it is of advantage if more than one second friction lining 8 is provided in the radial direction 9 one above the other on the outer plate 3. The spacing of the first friction linings 6 and the spacing of the second friction linings 8 as well as the points at which they are positioned will be as specified above so that, again with these embodiments, the second friction linings 8 engage between the first friction linings 6, i.e. the first and second friction linings 6, 8 mesh with one another, when the multi-plate clutch 1 is engaged.

Based on these embodiments, therefore, the inner plate 2 has at least one friction lining more than the outer plate 3. In principle, a converse arrangement of the first and second friction linings 6, 8 would also be possible, in which case the outer plate 3 has at least one friction lining more than the inner plate 2.

For details of the disposition and design of grooves used for these embodiments of the multi-plate clutch 1, reference may be made to the explanations given above, which also apply to these embodiments. However, it would also be possible for the grooves 13 in the first friction linings 6 to be different from one another so that, for example, the grooves 13 of the radially inner first friction lining have a different geometry from the radially outer first friction lining 6 of the inner plate 2. The same applies to the outer plate 3 if it is provided with more than one second friction lining 8.

The embodiments illustrated as examples represent possible embodiments of the multi-plate clutch 1 and details thereof, and it should be pointed out at this stage that different combinations of the individual embodiments with one another are also possible.

For the sake of good order, finally, it should be pointed out that in order to provide a clearer understanding of the structure of the multi-plate clutch 1 and details thereof, the latter are illustrated to a certain extent out of scale and/or on an enlarged scale and/or on a reduced scale.

| List of reference numbers | |
| --- | --- |
| 1. | Multi-plate clutch |
| 2. | Inner plates |
| 3. | Outer plates |
| 4. | Axial direction |
| 5. | Inner plate main body |
| 6. | Friction lining |
| 7. | Outer plate main body |
| 8. | Friction lining |
| 9. | Radial direction |
| 10. | Set of plates |
| 11. | Inner plate toothing |
| 12. | Outer plate toothing |
| 13. | Groove |
| 14. | Width |
| 15. | Circumferential direction |
| 16. | Groove |
| 17. | Angle |
| 18. | Friction lining segment |
| 19. | Groove |
| 20. | Groove |
| 21. | End face |
| 22. | End face |
| 23. | Surface |
| 24. | Width |
| 25. | Width |
| 26. | Curvature |
| 27. | Surface |
| 28. | Angle |
| 29. | Depth |
| 30. | Total thickness |
| 31. | Groove |
| 32. | Cross-sectional widening |
| 33. | Angle |
| 34. | Distance |
| 35. | Width |
| 36 | Groove |

The invention claimed is:

1. A wet-running multi-plate clutch comprising a number of inner plates and a number of outer plates disposed in an alternating arrangement in the axial direction, and every inner plate has an inner plate main body on either side of which a first friction lining is disposed respectively, and every outer plate has an outer plate main body on either side of which a second friction lining is disposed respectively, and the first friction linings are located entirely underneath the second friction linings in the radial direction so that the first friction linings move into frictional contact with the outer plate main bodies when the multi-plate clutch is engaged and the second friction linings move into frictional contact with the inner plate main bodies when the multi-plate clutch is engaged, wherein the first friction linings respectively have at least one first groove and the second friction linings respectively have at least one second groove having a smaller cross-sectional surface area, as viewed in the longitudinal extension of the second grooves, than the first grooves as viewed in the same direction wherein the first friction lining is formed by first friction lining segments, and at least one third groove and a number of fourth grooves are provided in each of the first friction lining segments, and the at least one third groove extends from a radially inner end face of the first friction lining segments in the direction towards a radially outer end face of the first friction lining segments and terminates at a distance apart from the radially outer end face, and the fourth grooves have a maximum width in the circumferential direction of between 1% and 20% of a maximum width of the third groove in the same direction and the fourth grooves extend, without interruption and without branching, from the radially inner end face of the first friction lining segments to the radially outer end face of the first friction lining segments, wherein the second friction lining is formed by second friction lining segments, and several fifth grooves are provided in each one of the second friction lining segments, and wherein a sixth groove is disposed adjoining the radially outer end of the third groove, and the sixth groove extends as far as the radially outer end face of the first friction lining segments or a seventh groove is disposed adjoining the radially outer end of the second groove and the seventh groove extends as far as the radially outer end face of the second friction lining segments or the sixth groove is disposed adjoining the radially outer end of the third groove, and the sixth groove extends as far as the radially outer end face of the first friction lining segments and the seventh groove is disposed adjoining the radially outer end of the second groove and the seventh groove extends as far as the radially outer end face of the second friction lining segments.

2. The multi-plate clutch according to claim 1, wherein at least one of the first grooves and the second grooves extend at an angle with respect to the radial direction.

3. The multi-plate clutch according to claim 2, wherein at least one of the first grooves and the second grooves are disposed so as to extend at an angle of between 1° and 30° with respect to the radial direction.

4. The multi-plate clutch according to claim 1, wherein at least one of the first grooves and the second grooves extend in a curved arrangement.

5. The multi-plate clutch according to claim 1, wherein the first friction linings are made from a material that is different from the material of the second friction linings.

6. The multi-plate clutch according to claim 5, wherein the second friction linings are made from a material that is more resistant to wear than the material of the first friction linings.

7. The multi-plate clutch according to claim 1, wherein the second friction linings have a bigger layer thickness than the first friction linings.

8. The multi-plate clutch according to claim 1, wherein the fifth grooves have a maximum width in the circumferential direction of between 1% and 20% of a maximum width of the second groove in the same direction and the fifth grooves extend, without interruption and without branching, from the radially inner end face of the second friction lining segments to the radially outer end face of the second friction lining segments.

9. The multi-plate clutch according to claim 1, wherein at least one of the fourth grooves and the fifth grooves have a triangular cross-section.

10. The multi-plate clutch according to claim 9, wherein the sixth groove has a maximum width in the circumferential direction of between 1% and 20% of a maximum width of the third groove in the same direction or the seventh groove has a maximum width in the circumferential direction of between 1% and 20% of a maximum width of the second groove in the same direction or the sixth groove has a maximum width in the circumferential direction of between 1% and 20% of a maximum width of the third groove in the same direction and the seventh groove has a maximum width in the circumferential direction of between 1% and 20% of a maximum width of the second groove in the same direction.

11. The multi-plate clutch according to claim 1, wherein the third groove has a cross-section which becomes wider in the direction towards the radially inner end face of the first friction lining segments or the second groove has a cross-section which becomes wider in the direction towards the radially inner end face of the second friction lining segments or the third groove has a cross-section which becomes wider in the direction towards the radially inner end face of the first friction lining segments and the second groove has a cross-section which becomes wider in the direction towards the radially inner end face of the second friction lining segments.

12. The multi-plate clutch according to claim 1, wherein the third groove has a cross-sectional widening in the region of the radially outer end or the second groove has a cross-sectional widening in the region of the radially outer end or the third groove has a cross-sectional widening in the region of the radially outer end and the second groove has a cross-sectional widening in the region of the radially outer end.

13. The multi-plate clutch according to claim 12, wherein at least one of the third groove and the second groove is mushroom-shaped.

14. The multi-plate clutch according to claim 1, wherein at least two first friction linings are disposed on the inner plate main body at a radial distance apart and the radial distance is bigger than a radial width of the second friction lining or second friction linings so that the second friction lining or second friction linings is or are able to engage between the first friction linings when the multi-plate clutch is engaged.

15. The multi-plate clutch according to claim 1, wherein at least two second friction linings are disposed on the outer plate main body at a radial distance apart and the radial distance is bigger than a radial width of the first friction lining or first friction linings so that the first friction lining or first friction linings is or are able to engage between the second friction linings when the multi-plate clutch is engaged.

* * * * *